US005619650A

United States Patent [19]
Bach et al.

[11] Patent Number: 5,619,650
[45] Date of Patent: Apr. 8, 1997

[54] NETWORK PROCESSOR FOR TRANSFORMING A MESSAGE TRANSPORTED FROM AN I/O CHANNEL TO A NETWORK BY ADDING A MESSAGE IDENTIFIER AND THEN CONVERTING THE MESSAGE

[75] Inventors: Maurice J. Bach, Haifa, Israel; Robert B. Hoppes, Hyde Park, N.Y.; Clifford B. Meltzer, Ossining, N.Y.; Kenneth J. Parchinski, Wappingers Falls, N.Y.; Gary J. Whelan, Rhinebeck, N.Y.

[73] Assignee: International Business Machines Corporation, Armonk, N.Y.

[21] Appl. No.: 531,579

[22] Filed: Sep. 21, 1995

Related U.S. Application Data

[63] Continuation of Ser. No. 966,821, Dec. 31, 1992, abandoned.

[51] Int. Cl.⁶ ..................................................... G06F 13/00
[52] U.S. Cl. .............................. 395/200.01; 395/200.14; 395/285; 370/466; 370/469
[58] Field of Search ...................................... 395/650, 500, 395/200.01, 200.14, 285, 800; 370/85.1, 85.13, 60

[56] References Cited

U.S. PATENT DOCUMENTS

| | | | |
|---|---|---|---|
| 4,428,043 | 1/1984 | Catiller et al. | 364/200 |
| 4,768,150 | 8/1988 | Chang et al. | 364/300 |
| 4,855,905 | 8/1989 | Estrada et al. | 364/200 |
| 4,941,089 | 7/1990 | Fischer | 364/200 |
| 5,124,909 | 6/1992 | Blakely | 395/200 |
| 5,142,622 | 8/1992 | Owens | 395/200 |
| 5,251,205 | 10/1993 | Callon et al. | 370/60 |
| 5,287,537 | 2/1994 | Newmark et al. | 395/800 |
| 5,307,346 | 4/1994 | Fieldhouse | 370/85.1 |
| 5,309,437 | 5/1994 | Perlman et al. | 370/85.13 |
| 5,327,558 | 7/1994 | Burke et al. | 395/650 |
| 5,490,252 | 2/1996 | Macera et al. | 395/200.01 |

*Primary Examiner*—Thomas C. Lee
*Assistant Examiner*—Duo Chen
*Attorney, Agent, or Firm*—Gerald R. Woods

[57] ABSTRACT

A system and method for distributing application-to-application network communications protocol processing. Host computers implement distributed API processing across a high speed I/O channel increasing throughput. The application API conforms to standard protocols but protocol processing is distributed using a cross-channel distributed sockets API at the session layer. This API allows multiplexing of data from one or more hosts to one or more front end routers managing network communications. Multiplexing increases network performance through parallel processing and advantageously employs host high speed I/O functions. Front end routers perform lower level protocol tasks necessary to exchange data over the communications network.

7 Claims, 16 Drawing Sheets

DSL/DSM Socket Relationship

UDP/TCP bind()

TCP listen() flow

NETWORK PROCESSOR FOR TRANSFORMING A MESSAGE TRANSPORTED FROM AN I/O CHANNEL TO A NETWORK BY ADDING A MESSAGE IDENTIFIER AND THEN CONVERTING THE MESSAGE

The application is a continuation, of application Ser. No. 07/966,821 filed Dec. 31, 1992 now abandoned.

BACKGROUND OF THE INVENTION

1. Field of the Invention

The present invention relates to systems for communicating between application programs over a telecommunications network. More particularly, the present invention relates to application to application communication using a defined protocol such as TCP/IP between systems which may include high performance input/output mechanisms.

2. Background and Related Art

Data processing systems are used for a large number of functions in business, research and education. The computer systems used for these functions are frequently geographically dispersed, but required to be interlinked for certain purposes. This has led to the creation of telecommunication networks linking computer systems and the creation of telecommunications protocols to assist in the orderly communication between systems.

Data processing application programs used with distributed computer systems often employ the client-server model for network applications. In this model, one or more computer systems are designated as "servers" able to respond to requests from "clients" to perform various services. Server applications may provide functions such as printing, file storage, or processing resources. The server process is typically started in one computer system and is caused to wait and "listen" for a request by a client for service. Upon receipt of that request, the server wakes up and provides the requested service.

Communications between client and server applications take place according to a defined network protocol. A protocol is a set of rules and conventions used by the applications participating in a conversation. The set of rules can become very complex and layered protocol models have been adopted to help simplify and manage network protocol definitions. The International Standards Organization (ISO) has developed the Open Systems Interconnection Model (OSI) for computer communications. The OSI model consists of seven layers with well defined interfaces between the layers. Most computer network protocols are described in terms of the OSI model.

FIG. 1 presents an example of a network illustrating the seven layer OSI model. Two computer systems are shown 102 and 104. The systems are connected by a Local Area Network (LAN) 106. The OSI model is applicable not only to local area networks, typically connecting multiple computers within a building, but also to wide area networks (WANs) connecting computers in different cities or countries and to internetworks (Internet) connecting several physically separate networks (either LANs or WANs).

Application programs 108 and 110 communicate over LAN 106 via protocol processors 112 and 114. Protocol processors 112 and 114 are typically implemented as part of the operating system of the computer running the application program. The OSI protocol comprises the following seven layers: Application(7), Presentation(6), Session(5), Transport(4), Network(3), DataLink(2), and Physical(1). The higher layers 4–7 operate on messages. The network layer 3 typically operates on packets, the datalink layer 2 on frames, while the lowest level physical layer 1 operates on bits of data.

In this illustration each computer has identical software layers and each layer logically communicates to the same layer at the other computer, except for the presentation layer. The physical layer is the hardware interface adapter. This portion physically connects to the other computer and controls the signals on the communications media. The Data Link layer provides the hardware interface routines usually in terms of software. This layer generally handles the interrupts, framing and unframing. The Network layer provides internet routing or forwarding packets to other computers on the network. This is generally done with routing tables. The Transport layer provides the flow control, assembly and disassembly of data from one computer to another. This layer has the most overhead in the protocol stack. The Transport layer sends control messages as well as data packets. The Session layer is the interface to the application program. In terms of TCP/IP often layers 4 and 5 are discussed conceptually as a single layer, known as the Transport layer. Layer 6 is the presentation layer. This layer provides common routines for applications but doesn't communicate with its matching component on the destination computer. Layer 7 is the Applications layer. A file transfer program would be an example of an application.

Several network protocols have been defined and are in use in computer networks. These include TCP/IP, Systems Network Architecture (SNA), and NetBios. The low level physical connection can operate on known technologies such as Ethernet, Token Ring, or long distance networks provided by the telephone companies.

The TCP/IP protocol was defined by the U.S. government and is used to link many research and educational institutions that perform work for the government. Its widespread use has resulted in many other companies adopting TCP/IP to be able to communicate with existing TCP/IP sites. Although developed before the OSI model, TCP/IP components can be mapped to the seven layer model. The TCP/IP "process" layer encompasses OSI Presentation and Session layers. Two Transport layers are defined, Transmission Control Protocol (TCP) which provides a connection based protocol, and the User Datagram Protocol (UDP) which provides a connection-less protocol. Internet Protocol (IP) provides the Network layer for both TCP and UDP while the DataLink layer is met by the appropriate hardware interface.

Returning to FIG. 1, application program 108 communicates via the network using an Application programming interface (API). The sockets protocol is one of the more prevalent application to application APIs. The sockets API was developed for use on Digital Equipment Corporation (DEC) VAX computers (DEC and VAX are trademarks of Digital Equipment Corp.) by the University of California, Berkeley, as the BSD operating system, a derivative of the UNIX operating system. (UNIX is a trademark of Unix System Laboratories.) The sockets API defines the format and parameter content of the commands an application program uses to establish communications with another application. It defines the API for both client and server applications and for connection-less and connection-based links. The defined API functions cause the operating system to issue the necessary commands to establish a communications link and to exchange data over that link.

The sockets API has been implemented on a variety of computer systems from small microcomputers to large mainframes. The sockets API has been implemented on IBM ES/9000 mainframes (IBM and ES/9000 are trademarks of the IBM Corp.) to provide network connectivity to programs running on those systems. This implementation has not been without problems, however, due to the differences in hardware architectures between the IBM ES/9000 computer and the DEC VAX computer for which the sockets API was originally developed. IBM ES/9000 computers and other "mainframe" computers typically are capable of processing a large number of programs and provide very high speed input output (I/O) capabilities. High speed I/O is necessary to provide the great throughput characteristic of mainframe computers. I/O is typically implemented as I/O Channels on these systems, with the channels having the ability to transfer data into or out of the system without intervention from the main processor. Channels can transfer several hundred megabytes of data per second using data streaming techniques. Most LANs, WANs, and telecommunication networks, however, are more limited and transfer only a few kilobytes to at most five megabytes per second. This data transfer mismatch results in undesirable mainframe network performance when implementing protocols such as TCP/IP.

FIG. 2 illustrates a prior art configuration for the connection of an IBM ES/9000 processor (having a System/370 or System/390 architecture) to a local area network. (System/370 and System/390 are trademarks of IBM Corp.) Processor 202 is connected through its channel 204 to a control unit 206 that is connected to the LAN 208. The protocol processor in processor 202 performs all of the network protocol functions such as formatting messages for transmission over the LAN. Control unit 206 accepts the transmission packets in physical adapter 212 which is adapted for channel attachment and the receipt of high volumes of data, and places the packets on the LAN via physical adapter 214 that is adapted to attach to a network. The opposite flow takes place for packets received from the LAN.

The processor 202 thus spends considerable processing time handling the routine network tasks in protocol processor section, and is generally unable to take advantage of the high speed I/O capabilities because of the limited receiving abilities of LAN 208. The processing time spent in these network tasks is therefore unavailable for more productive processing thereby reducing the overall effectiveness of the processor 202.

A technical problem of improving the performance of large computer systems when engaging in network communications using standard protocols is therefore presented.

SUMMARY OF THE INVENTION

It is therefore an object of the present invention to offload routine network tasks from the main processor while maintaining standard network protocols.

It is a further object of the invention to provide multiple paths from the main processor to the network so that network traffic can be processed in parallel to increase throughput.

It is yet another object of the invention to provide an ability to process network traffic from multiple main processors in a single network connected processor.

It is yet another object of the invention to allow the main processor to take advantage of its high speed I/O abilities without sacrificing network API compatibility.

It is yet a further object of the invention to provide a network protocol processing system that contains no predefined limit on the number of sockets open or communications networks served.

It is yet a further object of the invention to provide a system that supports distributed network protocol processing.

The system of the present invention communicates with a network having a specified protocol such as TCP/IP. Multiple application programs can be operating on the main processor (host) and they can be communicating with a number of other processors on different networks. The host system of the present invention has a high speed input/output (I/O) facility connected to a network front end router. The host system implements a standard API for interacting with application programs. The API messages are transformed for network processing by the front end router. The API is logically distributed from the host processor to the front end router through the high speed I/O facility.

The system of the present invention connects one or more host processors to each front end router and can connect one or more front end routers to each host. Front end routers can be connected in turn, to one or more telecommunication networks.

The above described objects and other objects, features and advantages of the invention will be apparent from the following more particular description of a preferred embodiment of the invention, as illustrated in the accompanying drawing wherein like reference numbers represent like parts of the invention.

DETAILED DESCRIPTION OF THE PREFERRED EMBODIMENT

Figure 1:
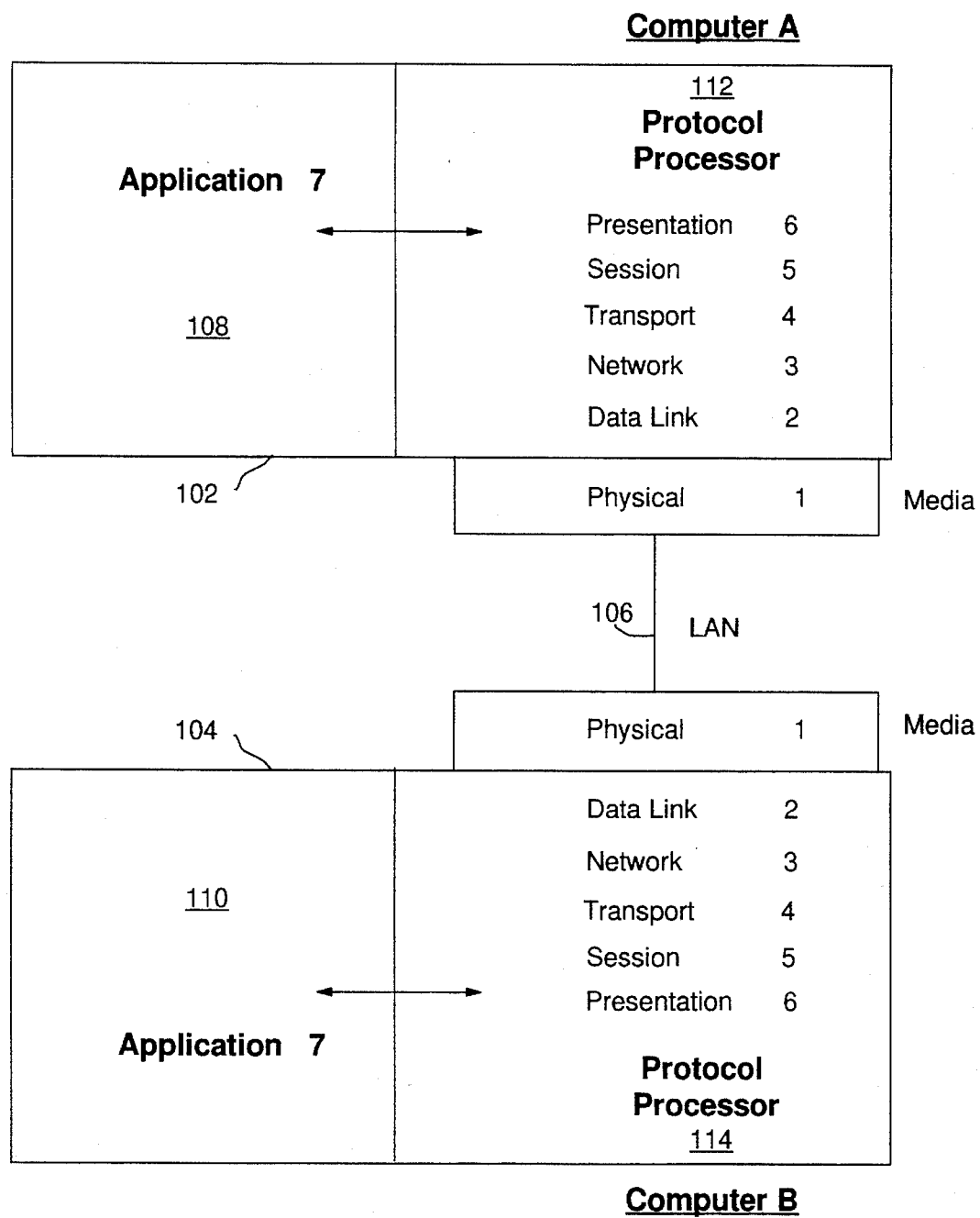
FIG. 1 is a block diagram illustrating the layers of the open system interconnect model.
Figure 2:
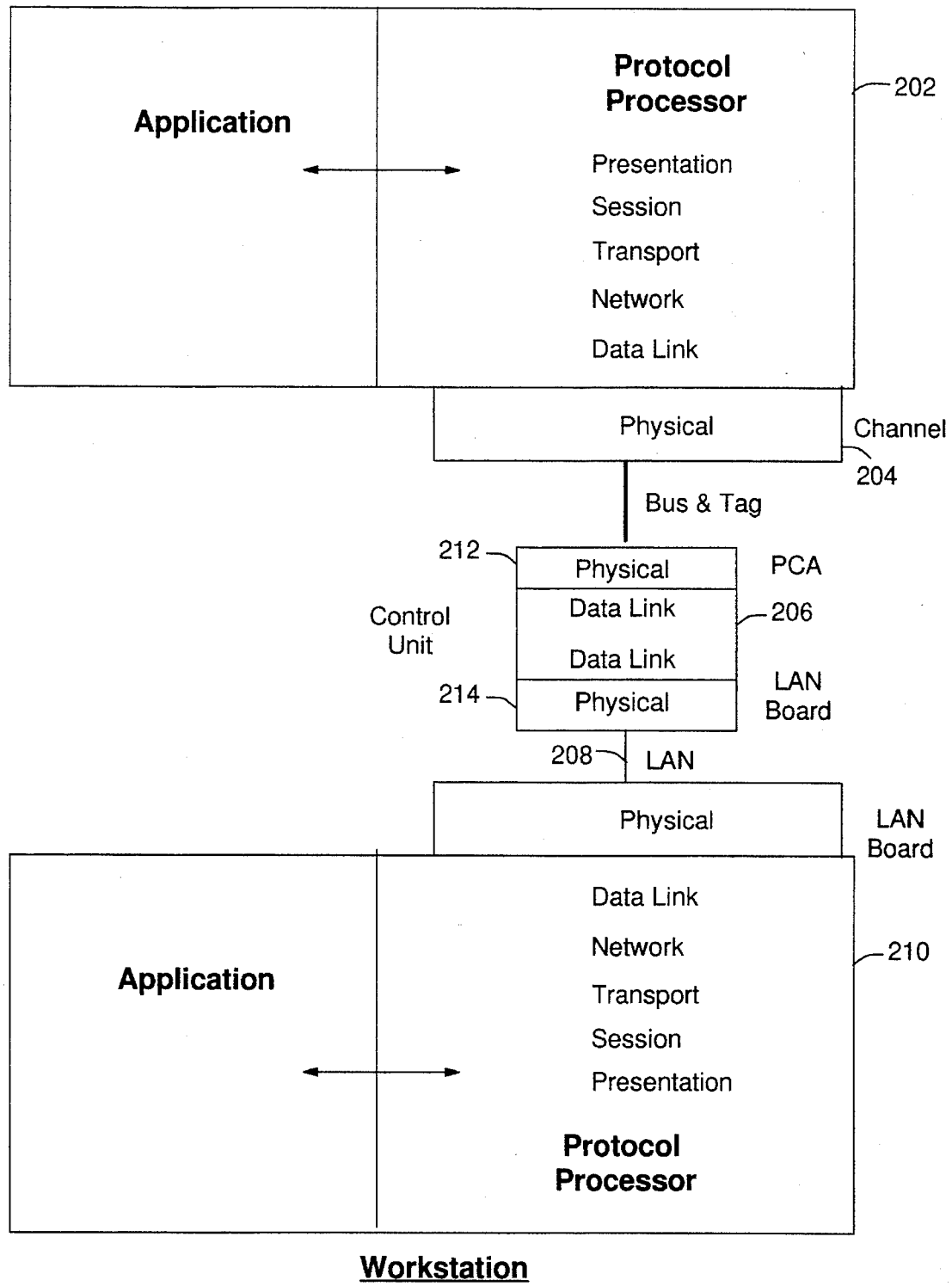
FIG. 2 is a block diagram showing prior art host to network interconnection structure.
Figure 3:
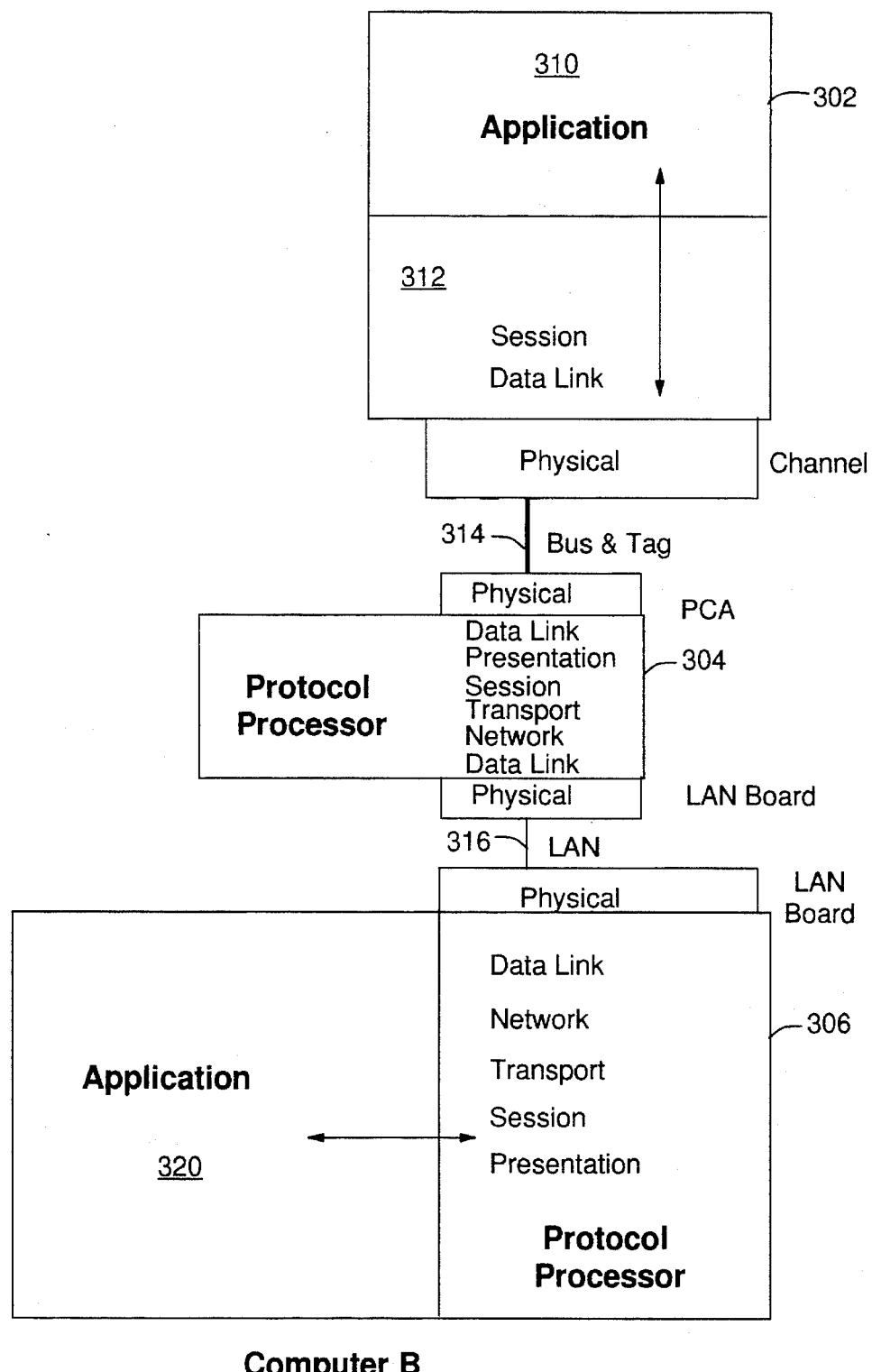
FIG. 3 is a block diagram illustrating the preferred embodiment of the present invention.

The preferred embodiment of the present invention will be described with reference to the figures. FIG. 3 presents an overview of the preferred embodiment. Application programs 310 are processed by host processor 302. Application to application network links are established using a standard API such as sockets. The API accepts messages from the Application 310 to the session/datalink 312. Session/datalink 312 is connected through high speed I/O channel 314 to front end processor 304 without further protocol conversion. Front end router 304 transforms the session layer message received from session/datalink 312 to the physical form required by network 316 using defined transport, network, and datalink protocols. Network 316 manages communication with the remote application 320 running in processor 306.

The preferred embodiment of the distributed sockets interface (DSI) is implemented with computer software running in the host processor 302, a high speed interface adapter between the host and front end router, and a software configured front end router. The front end router of the preferred embodiment is a microprocessor with a Micro Channel bus, such as the IBM PS/2 computer. (Micro Channel and PS/2 are trademarks of the IBM Corp.) Other configurations are possible, however, including incorporation of the front end router function within the high speed I/O channel processing logic of the host processor.

Figure 4:
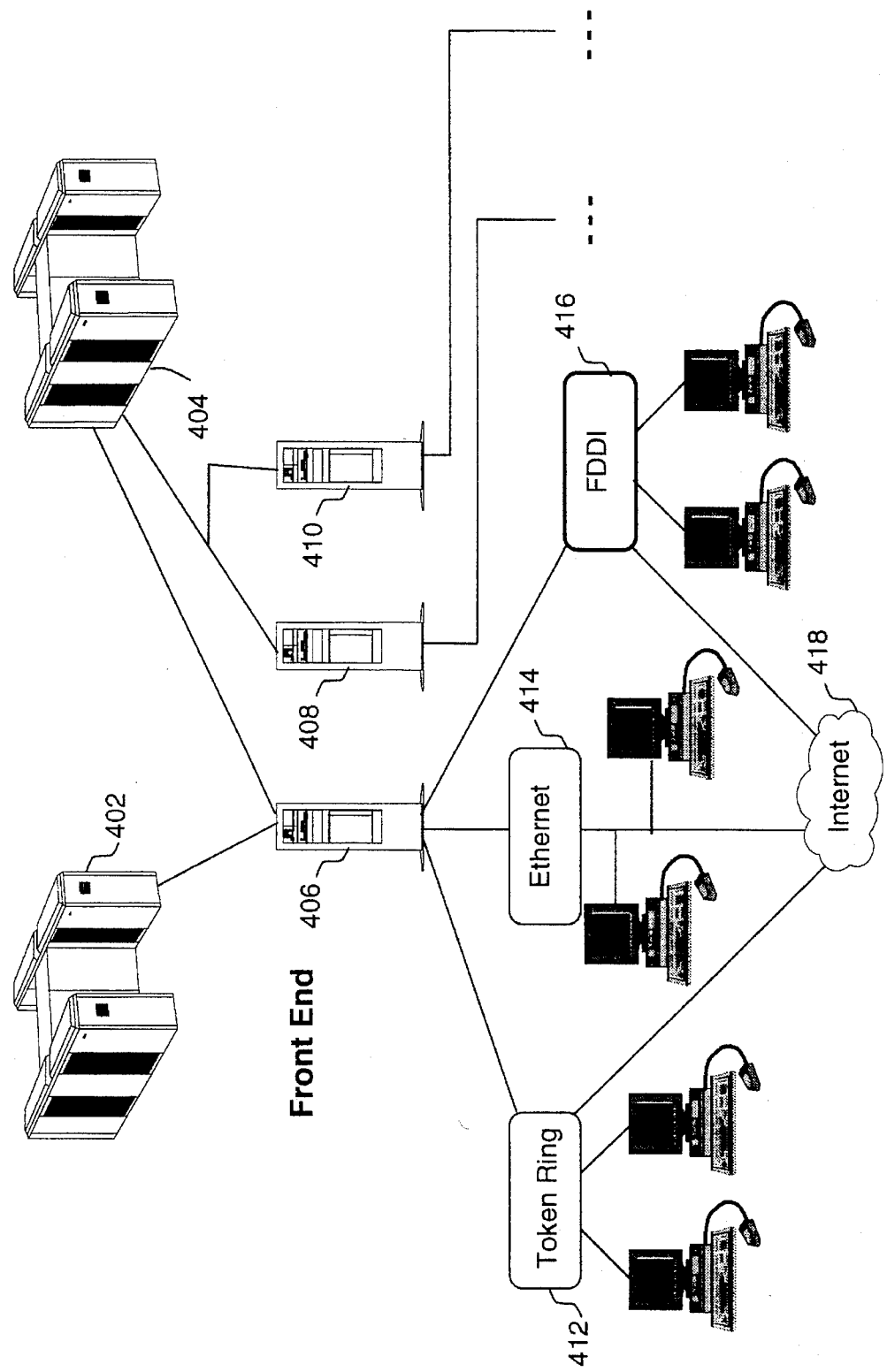
FIG. 4 is an overview of the interconnections permissible in a system according to the present invention.

A possible configuration of hosts and front end routers according to the present invention is shown in FIG. 4. Hosts 402 and 404 are connected to front end routers 406, 408 and 410. Each front end processor can be connected to one or more network topologies 412, 414 and 416 or to other networks via Internet 418. The possible configurations include multiple hosts connected to each front end router, multiple routers connected to a single host, multiple networks connected to each front end router, and multiple routers connected to each network or subnetwork. There is therefore multiplexing at every level of the preferred embodiment.

Figure 5:
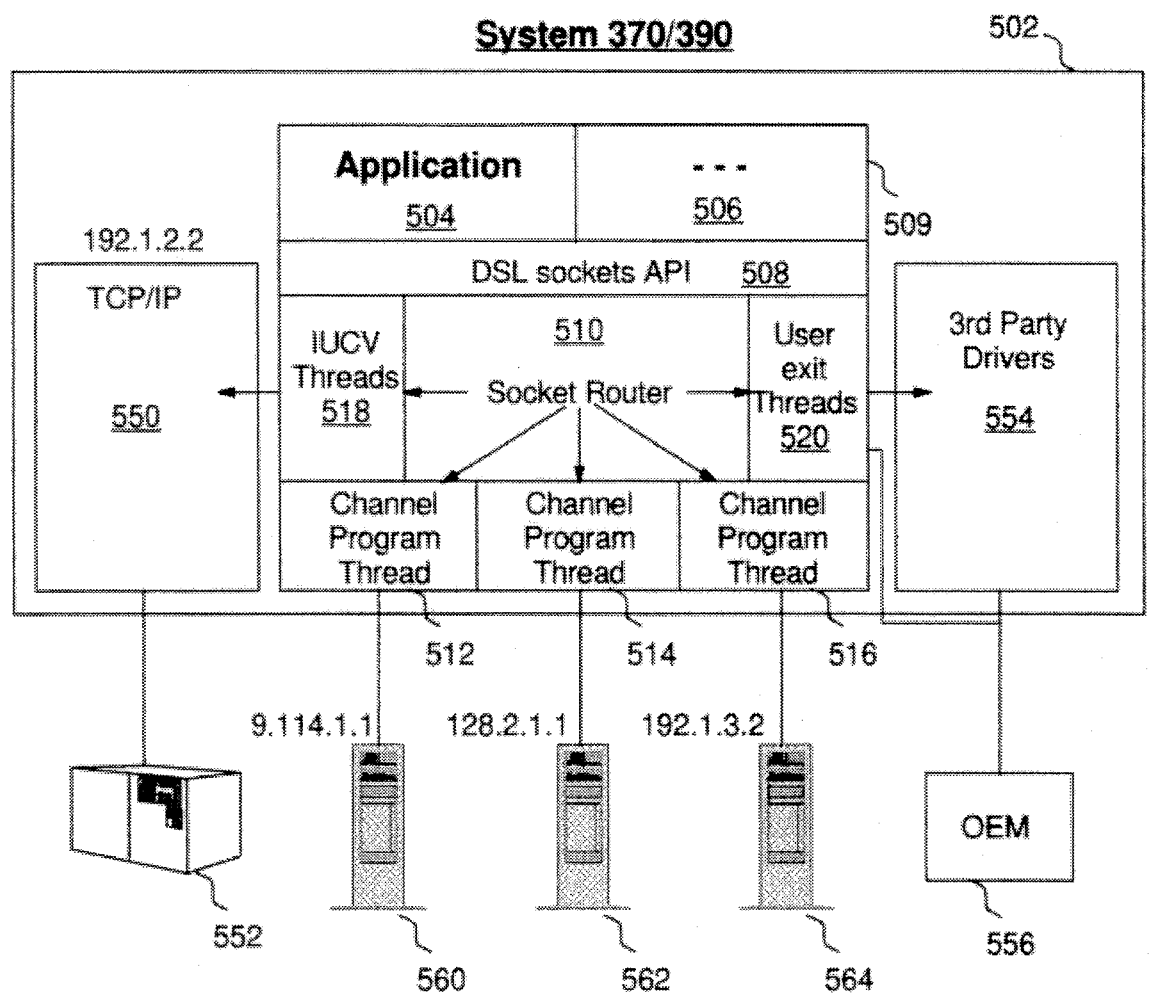
FIG. 5 is a block diagram illustrating selected host system components of the preferred embodiment of the present invention.

FIG. 5 illustrates the host components of the preferred embodiment of the present invention. The network communication process is implemented using a distributed sockets API function 508. This function 508 implements a Distributed Sockets Library (DSL) allowing the distribution of API function from the host 502 to routers 560, 562 and 564 or the use of undistributed network functions such as host based TCP/IP 550 and control unit(s) 552 or other channel to network drivers 554 and network adapter devices 556. Provision of a standard sockets library allows programs previously written to this interface to be used in the distributed environment of the present invention without modification. Examples of application programs that could be used include FTP file transfer program for accessing server files remotely, and NFS, network file system, allowing use of server files by remote file systems.

The distributed sockets API 508 is a multithreaded process operating on the host processor. Socket router 510 accepts DSL API commands and routes them to DSL channel program 512, 514 and 516 or to an interprocess communications thread 518 or user exit thread 520 depending on the specified configuration, the API command and the supplied parameters. The socket router supports the use of multiple front end routers by managing the mapping of sockets to routers using the control block structures described below. The interprocessor threads 518 and user exit threads 520 and their downstream devices form no part of the present invention.

Channel program threads 512, 514 and 516 manage communications with the front end routers 560, 562 and 564. Although only three channel program threads and three routers are shown, the preferred embodiment of the present invention is not limited as to the number of threads or front end routers. The preferred embodiment is fully multithreaded allowing connections limited only by processor resources. The process embodied in the channel program threads will be described in greater detail below.

Host computer system 502 is able to process a number of application programs 504 and 506. Host computer systems are frequently partitioned into a number of address spaces for running application programs. For example, in FIG. 5, the TCP/IP process 550, the applications and DSL API and related programs 509, and the third party drivers 554 run in three separate address spaces. All applications running in multithreaded address space 509 are able to access the distributed sockets library (DSL) 508 for application to application communications. Inclusion of the DSL API and related channel program threads within a single address space improves system performance by avoiding cross address space transaction processing overhead.

Figure 6:
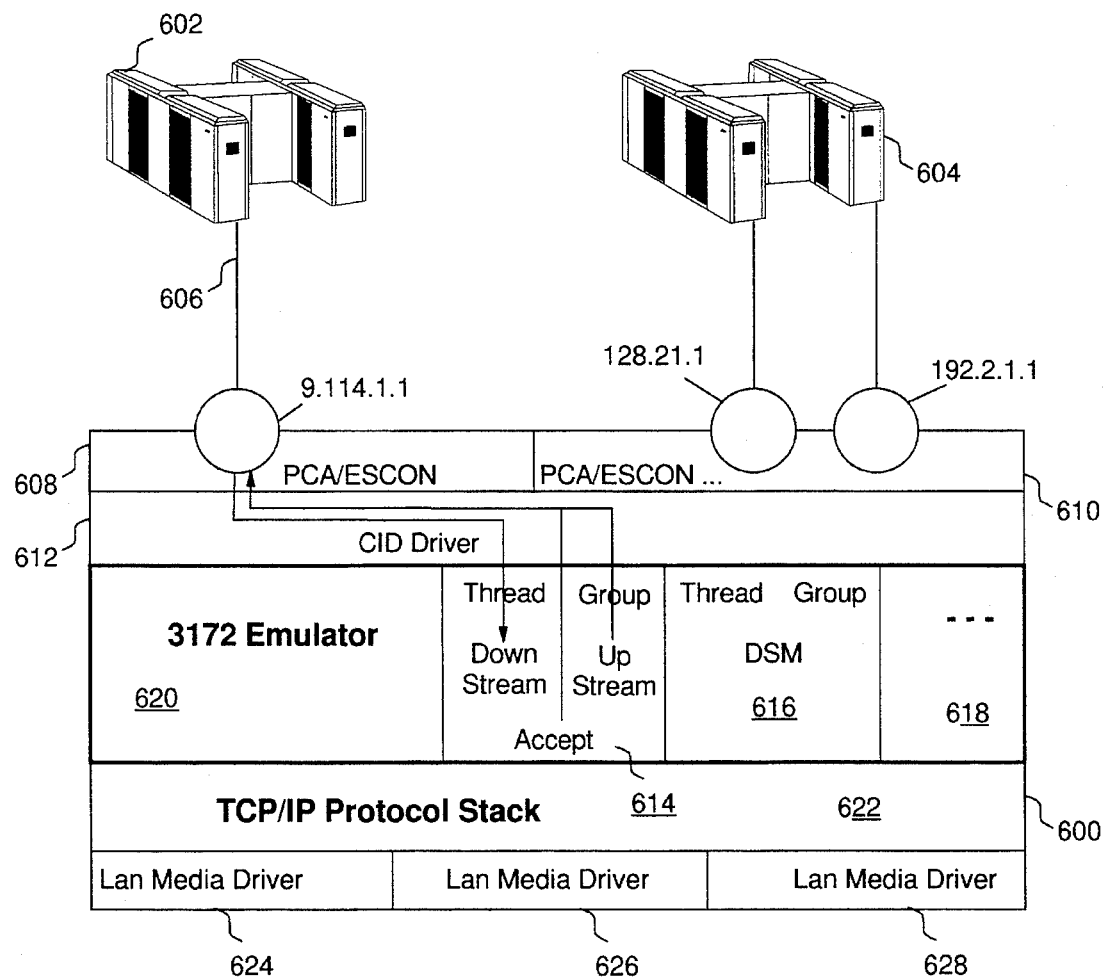
FIG. 6 is a block diagram illustrating selected front end router components of the preferred embodiment of the present invention.

A front end router according to the preferred embodiment of the present invention is shown in FIG. 6. Framing, internet routing, and flow control, also known as the Data Link, Network and Transport layers of the communications protocol stack, are performed by the front end router. Front end router 600 is attached to host 602 through a channel cable 606. The connection can either be a parallel data bus connection or a serial connection, such as the IBM ESCON serial connection. (ESCON is a trademark of the IBM Corp.) Each host connection has an associated Internet address specified according to the well defined Internet class A, B, or C four octet address standard. For example, the link via cable 606 to host 602 has Internet address "9.114.1.1".

Channel cable 606 is attached to front end router 600 through one of two channel adapter card 608 and 610. Although only two channel adapter cards are shown, the number actually employed is limited only by the physical constraints of the front end router enclosure. The channel adapter cards 608 and 610 can be any known adapter for connecting a high speed channel output to a Micro Channel bus or similar computer. Examples are the IBM PCA adapter card and the IBM ESCON adapter card for connecting respectively to parallel and serial channels. One or more internet addresses is associated with each channel adapter card.

Channel Interface Driver (CID) 612 manages communications with the host over the high speed channel. This driver provides a session level interface for applications to communicate with the host system channel. The CID is multithreaded allocating a send and a receive thread to each channel. CID driver 612, in turn, interfaces with one or more Distributed Sockets Module (DSM) thread groups 614, 616 and 618 or with a 3172 emulator 620. Emulator 620 is provided to handle communications routed by the socket router through the prior art host based TCP/IP process. The DSM thread groups, which will be discussed in greater detail below, connect to the TCP/IP protocol stack 622 that provides TCP/IP data transformation and placement of the data on one of the connected networks through LAN media drivers 624, 626 and 628. Each subchannel is assigned a thread group and each socket has an upstream, downstream and, in the case of a TCP socket, accept thread within that thread group. The TCP/IP protocol stack and LAN media drivers operate according to known principles and do not form a part of the present invention.

Figure 7:
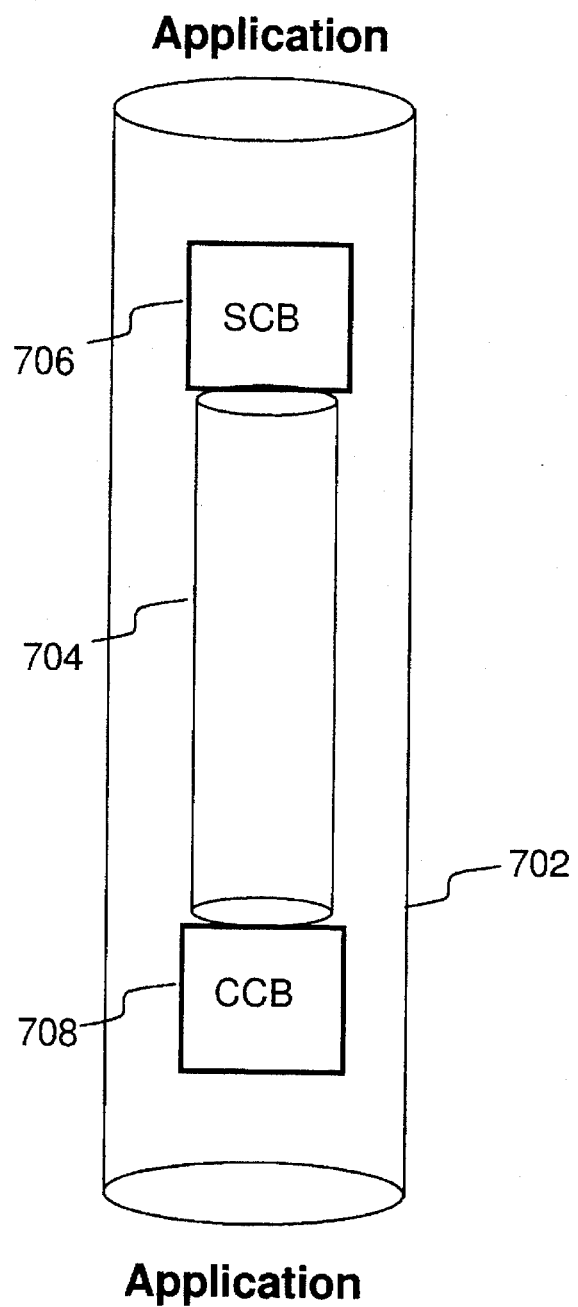
FIG. 7 is an illustration of the logical structure of distributed sockets according to the present invention.

The logical socket connection formed by the preferred embodiment of the invention is illustrated in FIG. 7. The socket protocol allows application to application communication to take place over what appears to be a direct connection or pipe, 702. The distributed sockets system of the present invention establishes a socket control block (SCB) 706 associated with the host channel program thread 512 (the DSL) and a connection control block (CCB) 708 associated with the distributed sockets module (DSM) 614 of the front end router. The connection between SCB 706 and CCB 708 defines a second logical pipe 704 for passing data between the host and the front end router.

Distributed Sockets Process Details

The standard sockets API has a set of commands to establish the application to application socket connection and to transfer data between the connected applications. The commands used by server applications differ from those used by client applications due to the nature of their processes. As discussed above, the server is initialized to wait for a client request and then act on it. The client, however, only submits requests and accepts the results of those requests. A subset of socket commands are critical to establish and maintain application to application network communications. Several of these will be discussed in detail below following a presentation of the control block structure used to manage the distributed sockets and a review of the threading model employed. Although all socket commands are not discussed in detail, the implementation of other commands will be clear to those skilled in the art based upon the descriptions presented.

Distributed Sockets Control Blocks

The preferred embodiment of the present invention manages the distribution of socket processing by establishing control blocks in the host and front end router and by passing data messages between the host and front end router over the I/O channel. As described above, the logical link between the host and front end router control blocks creates a logical data pipe for communications. The host DSL control blocks and front end router DSM control blocks will be described with reference to FIG. 8 and FIG. 9 respectively.

Figure 8:
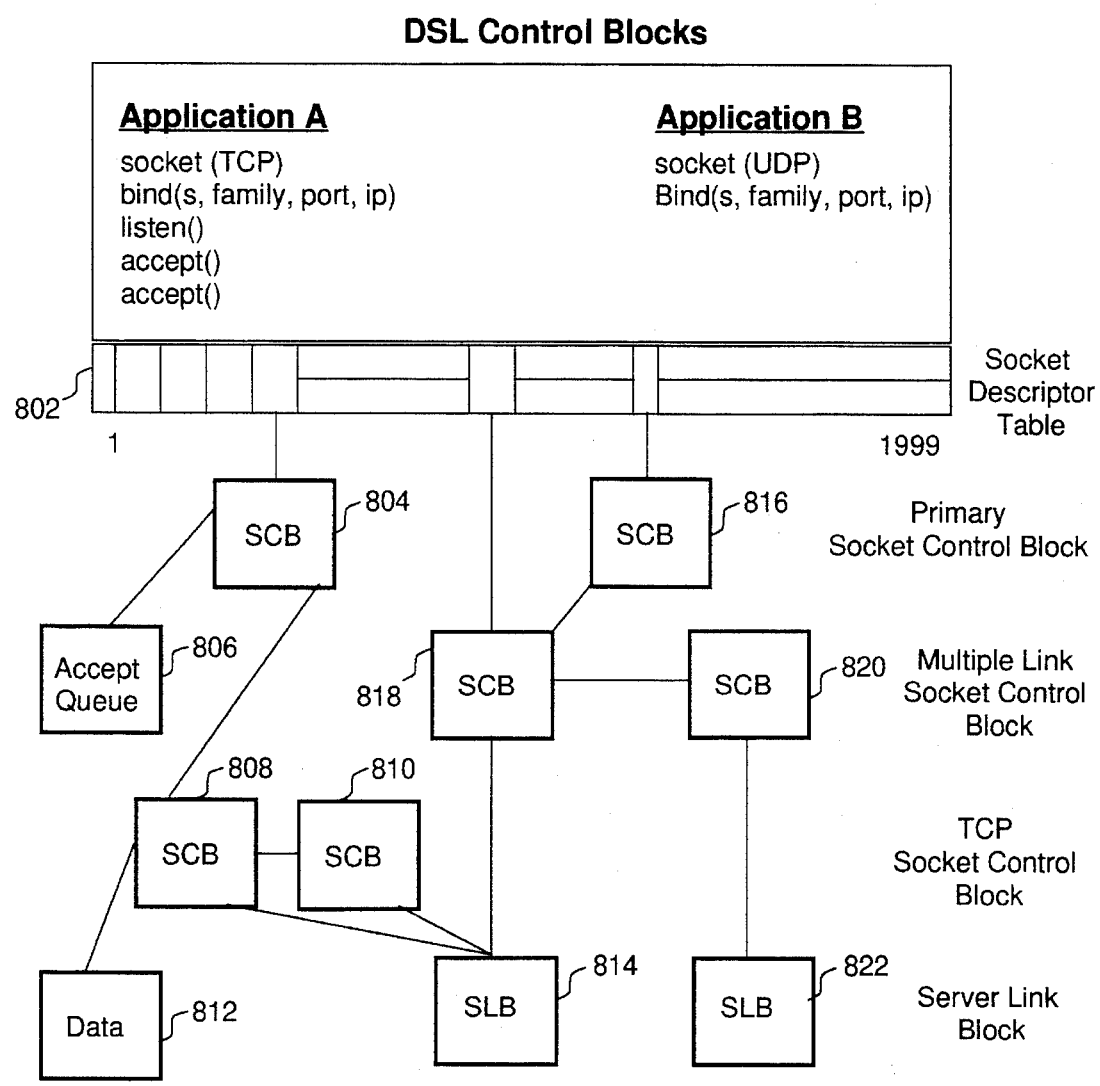
FIG. 8 is a block diagram illustrating the control block structure of the host portion of the preferred embodiment of the present invention.

A block diagram of the host DSL control blocks is presented in FIG. 8. The DSL program uses two types of control blocks: the Server Link Block (SLB); and the Socket Control Block (SCB).

One SLB, e.g. 814, is used to control each server link. This allows the DSL to communicate with multiple DSMs on multiple front end routers. In the preferred embodiment this control block is allocated at DSL startup based on a configuration file. The SLB maintains the information needed to communicate with the channel interface.

Socket Control Blocks (SCB), e.g. 804, are used to manage the application sockets. The SCBs are anchored off of Socket Descriptor Table 802 which is an array of pointers to the SCBs. An application requesting socket services is returned an index into the Socket Descriptor Table 802. The number of SCB chains depends upon whether a TCP or UDP socket is requested. Primary SCBs 804 and 816 are the controls blocks for the "socket()" API call and one exists for each open socket. Multiple Link SCBs are created when multiple front end routers are bound to the application. Each front end router has a unique multiple link SCB which in turn points back to the primary SCB.

Accept queue 806 and TCP SCBs 808 and 810 are present only for TCP sockets. Since TCP has a socket for every connection, one SCB per connection is generated. The accept queue maintains a chained list of asynchronous accept messages. These messages are accepted from the DSM and queued by the DSL prior to the application issuing an "accept()" call. When an "accept()" call is issued, the accept queue is accessed and a TCP SCB is created 808 and 810 and that SCB is provided to the application. The accept queue is anchored off the primary SCB in a single link (front end router) environment or off the multiple link SCB in a multiple link environment.

Referring again to FIG. 8 the DSL process will be illustrated by two example process flows. Server application A is being initialized to serve network client requests. The first API call is "socket()". This command establishes a TCP (connection based) socket for the application. In a similar manner Application B issues a "socket()" to establish a UDP (connectionless) socket. The "bind" command binds the socket to the an IP address and port at that address. Finally, application A, issues a "listen()" command prior to issuing accepts for that connection. The "accept()" command is used to accept connections from clients on the network.

The application A "socket()" command causes an entry to be allocated to the application from the socket descriptor table 802 and an SDT index returned to the application. The SDT points to a primary socket control block (SCB) 804. Chained to the TCP (connection) SCB 804 is an accept queue 806. The accept queue chains the client connection information waiting for the server application to issue an accept(). The distributed sockets model allows asynchronous processing of certain commands and data across the network. Thus, network connections from a client application can be chained into accept queue 806 before application A issues an "accept()" command asking for a connection. Asynchronous processing allows an increase in network throughput. In FIG. 8 Application A has issued two "accept()" calls creating TCP socket control blocks 808 810. TCP socket control blocks are associated with each "accept()" and address the actual data 812 received over the network via SLB 814. Data 812 is enqueued off SCB 808 waiting for application A to issue a read() call.

Application B in FIG. 8 has issued a socket command to establish a connectionless UDP socket. This results in allocation of an entry in socket descriptor table 802 and the creation of primary socket control block 816. Application B issues a "bind()" call with address ip=INADDR_ANY causing primary SCB 816 to be linked to multiple link SCBs 818 820 that are in turn linked to the two front end routers by SLBs 814 and 822. This illustrates the manner in which the preferred embodiment supports the connection of a single application to multiple front end routers and networks. Multiple link connections can be made in both TCP and UDP sockets. In this example there is no data queued for application B.

Figure 9:
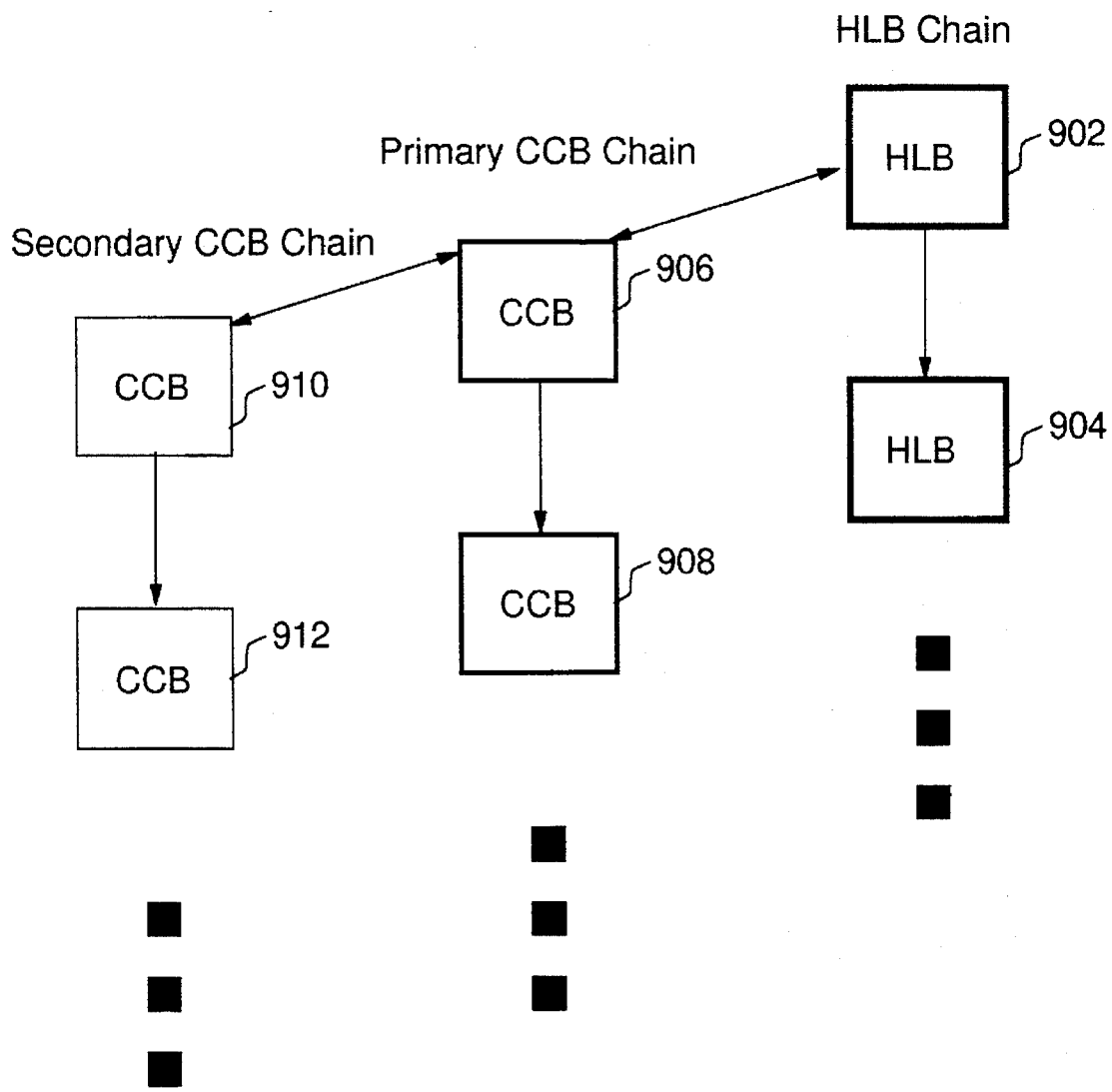
FIG. 9 is a block diagram illustrating the control blocks employed in the front end router.

FIG. 9 illustrates the controls blocks used by the Distributed Sockets Module (DSM) in the front end router. A host link block (HLB), such as 902 or 904, is allocated at startup for each host link. The provision for multiple chained HLB control blocks enables connection of the front end router to multiple hosts or to multiple channels or subchannels on a single host. The HLB stores the information necessary to communicate with the channel adapter interface and stores the pointers to the primary CCB chain.

Two Connection Control Block chains are used by the DSM. The primary Connection Control Block CCB 906 is chained to HLB 902. A primary CCB is created for each "socket()" API call made on the link managed by associated HLB and contains the information needed to maintain that socket. Additional primary CCBs 908 associated with HLB 902 are chained to CCB 906. A secondary CCB chain, such as 910 and 912, is created for each TCP socket. One secondary CCB exists for each "accept()" API call issued by the DSL.

Distributed Sockets Communication Flow

Figure 10:
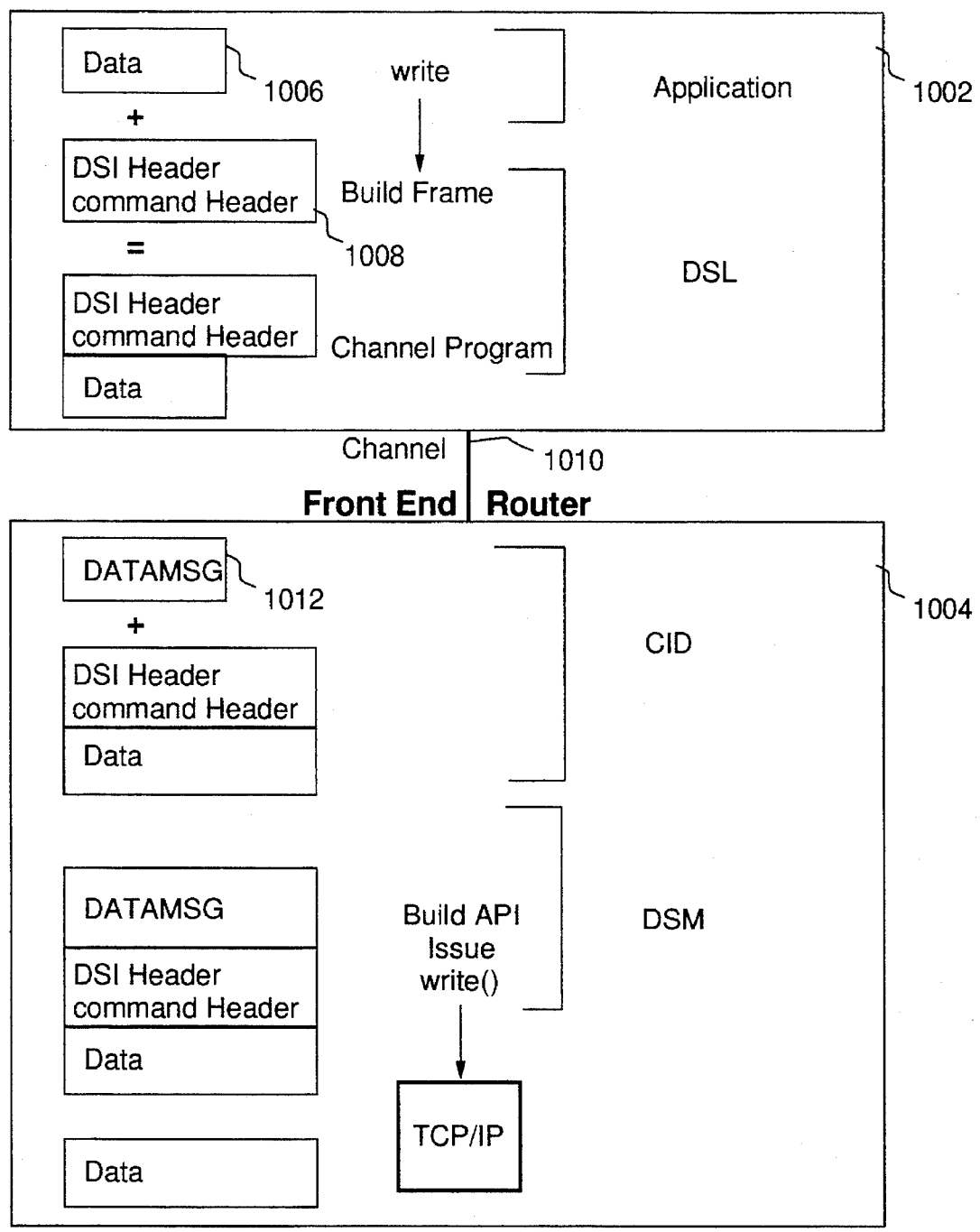
FIG. 10 is an example of the process flow for network messages in a system embodying the present invention.

FIG. 10 illustrates the communication flow when a socket "write()" API command is issued by an application in a host processor. The "write()" API is issued by either a client or server process to pass data across the network to be read by the connected process. FIG. 10 illustrates the data flow of a socket write() command issued by an application in a host 1002 and processed through the front end router 1004 using the preferred embodiment of the present invention. The application issues a "write()" socket API command with associated data 1006. The DSL process according to the present invention, builds a distributed sockets interface (DSI) header 1008 and attaches it to the data before passing it to the channel program. The header consists of a standard protocol header used to communicate between the DSL and DSM and a command specific header that is specific to the API command issued. As discussed above, messages may be asynchronous or synchronous depending upon the API command. The channel program passes the data over high speed I/O channel 1010 to front end router 1004. The channel interface driver (CID) constructs a DATAMSG header 1012 for the data received on the channel and passes the DATAMSG to the distributed sockets module process. DSM builds the API call and causes a "write()" with the necessary data to be placed on the TCP/IP protocol stack.

API Command Logic Flow Diagrams

FIGS. 11–16 will be used to present the logic flow of the preferred embodiment of the present invention. Logic flow will be discussed for selected critical communications commands. This logic is readily extensible to all other sockets API commands.

Figure 11:
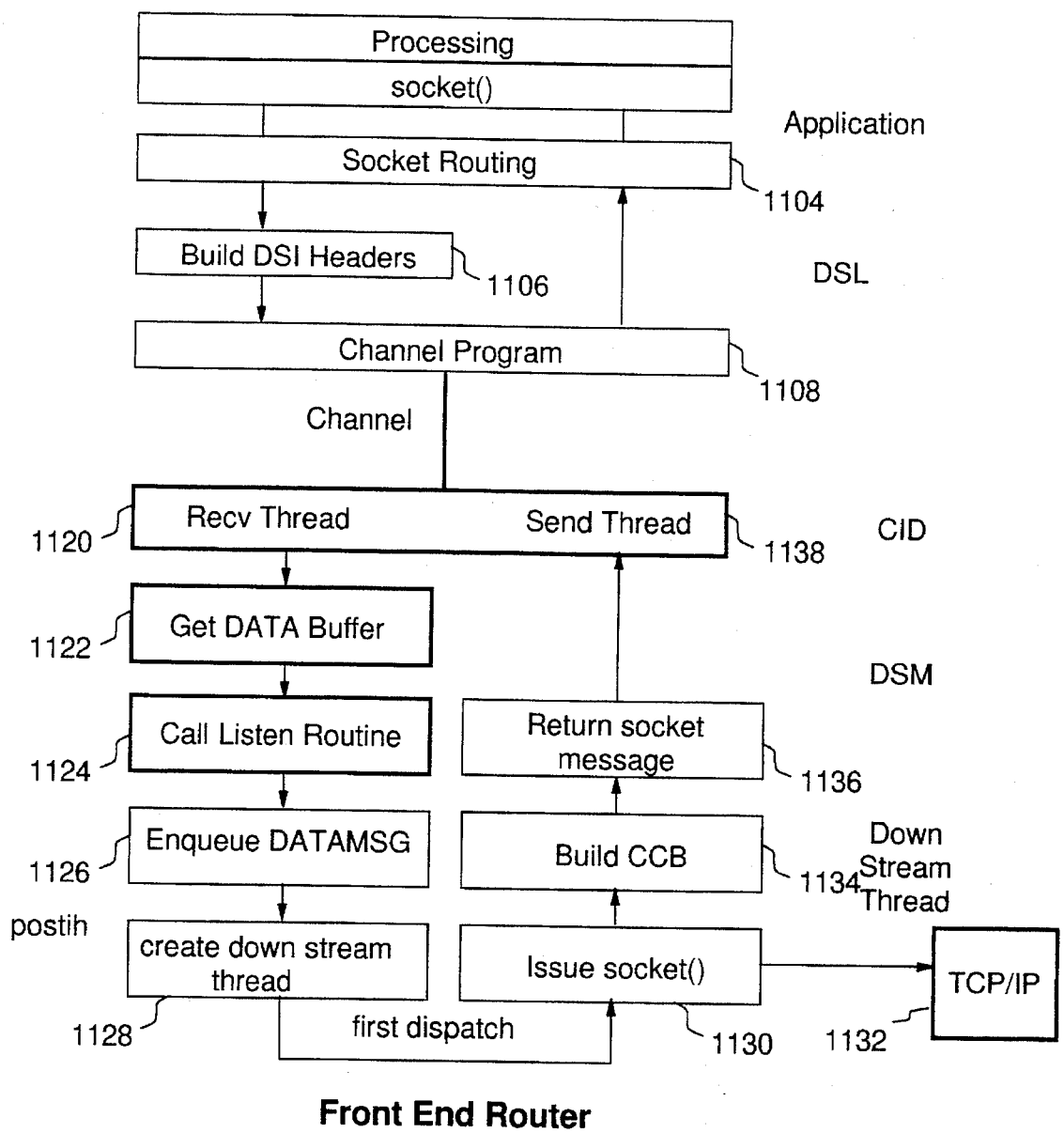
FIGS. 11–16 are structured flowcharts illustrating the logic and dataflow for selected API commands using the preferred embodiment of the present invention.

FIG. 11 illustrates the flow of a "socket()" call to initialize a socket for application to application communication. Both UDP and TCP connections start with a "socket()" call.

The DSL first retrieves the next available slot from the socket descriptor table and builds the SCB 1104. The socket router must determine which front end router to direct the message to based on supplied parameters. Once established the router will ensure that the communication occurs over the appropriate SLB to HLB link using data from the primary SCBs. The DSL builds the DSI headers 1106 and message and sends the socket request to the channel program 1108. The receive thread 1120 of the channel interface driver builds the DATAMSG 1122, calls the listen routine 1124 and enqueues the datamsg 1126. The DSM postih routine creates a CCB 1134 chained from the HLB and starts a downstream thread 1128 for the new socket. The downstream thread issues a socket() api call 1130 to the TCP/IP protocol stack. TCP/IP will return the actual socket addressa and the DSM will store that address in the CCB. The DSM then returns the address of the CCB 1136 as the socket number to the DSL through the send thread 1138 of the CID. Channel program 1108 receives the socket address and the DSL stores this socket in the SCB and uses it for all subsequent API calls, e.g. send, recv, write and read. The DSM will use the actual socket stored in the CCB when communicating with the TCP/IP stack in the front end router. This technique gives instant addressability to the CCB when the DSM is processing requests. The DSL finally returns the socket descriptor to the application, which completes the socket() api call.

Figure 12:
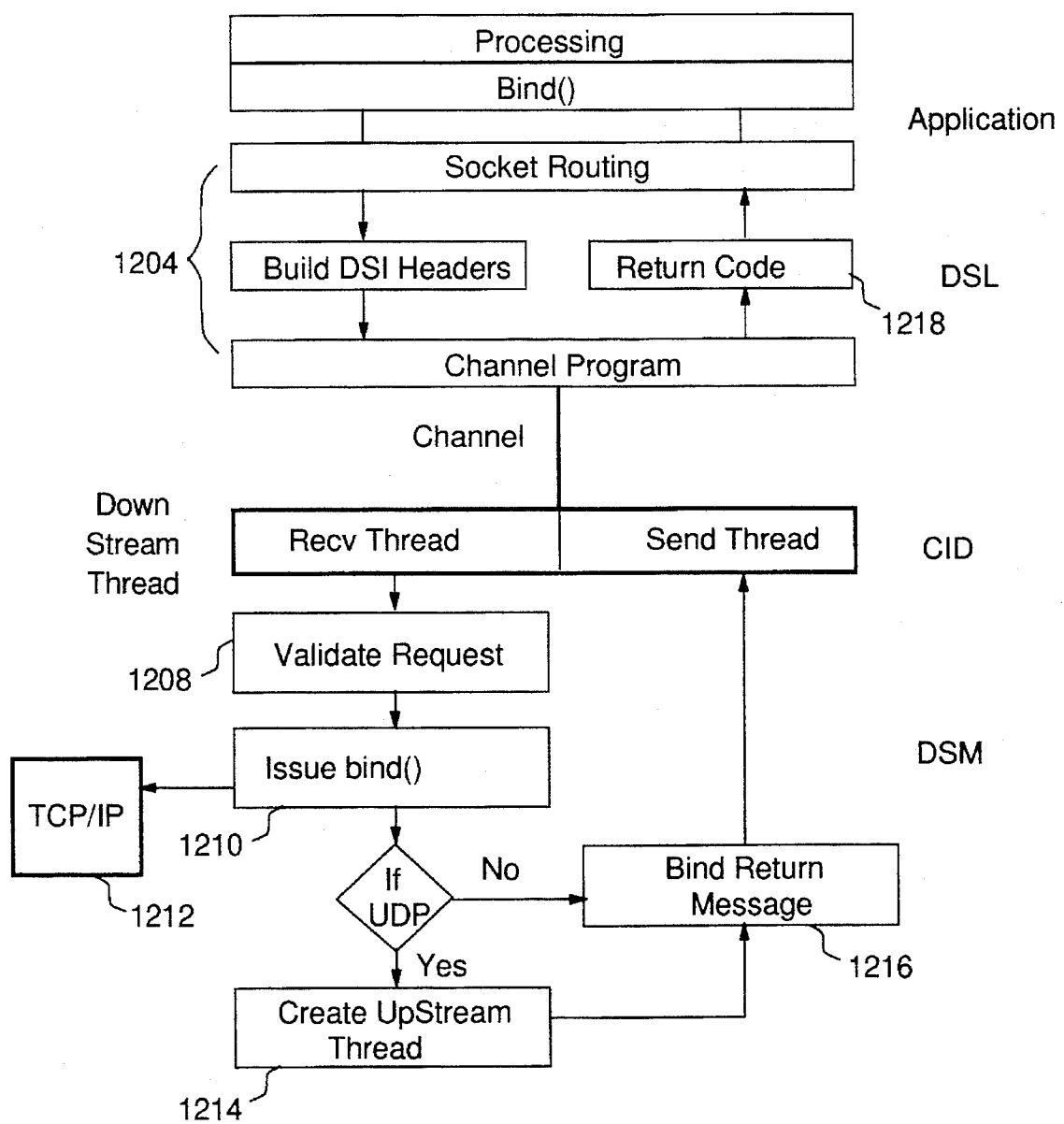

The UDP/TCP "bind()" API flow is illustrated in FIG. 12. The "bind()" call causes the DSL to build a bind request and send it to the DSM 1204. The DSL will send a bind() request to all front end routers if multiple SLBs exist and "INADDR_ANY" was specified as the address.

The DSM is multithreaded and manages three threads for each socket. An "upstream thread" handles transactions from the network. A "downstream thread" handles requests from the host, while an "accept thread" handles TCP "accept()" API commands from the server. When the DSM receives a "bind()" command the "downstream" thread started by the socket() call validates the request 1208. It next issues a "bind()" command 1210 to the TCP/IP protocol stack 1212. The DSM will change the IP address to the address specified in the configuration file for that subchannel. If the bind is for a TCP connection, an "upstream thread" is started 1214. Both TCP and UDP bind requests return a "return message" 1216 to the DSL. DSL waits for all return codes and provides an "ORed" return code 1218 back to the application.

The upstream thread created by the TCP "bind()" command issues a "recvfrom()" command to the network to allow asynchronous communication and sends asynchronous data messages to the DSL upon receipt.

TCP connections differ slightly depending on whether issued by a client or a server application. The client issues "socket()" and "connect()" calls while a server issues "socket()", "bind()", "listen()", and then "accept()" for each connection.

Figure 13:
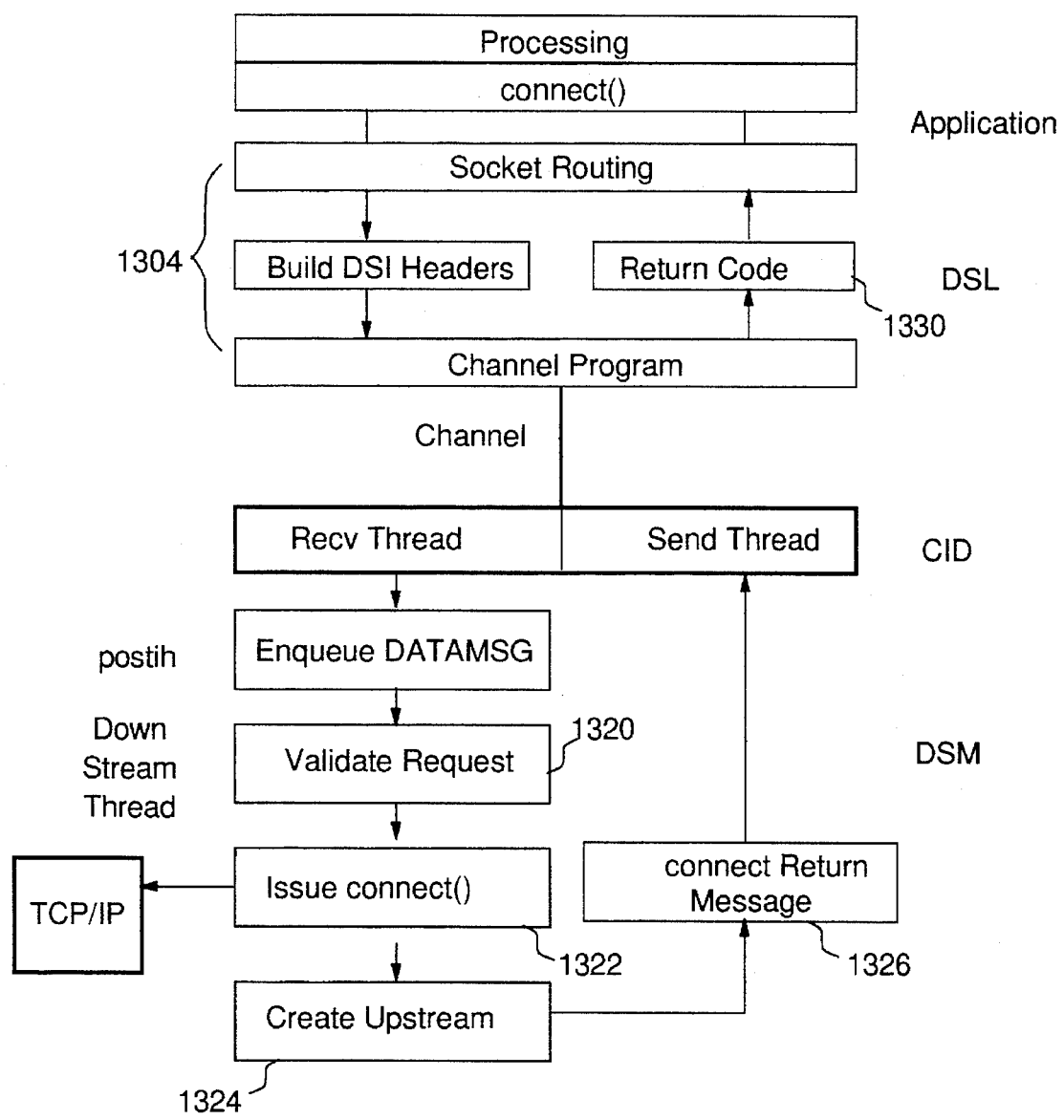

The TCP client "connect()" flow is illustrated in FIG. 13. The DSL accepts the call and using the SDT, SCBs and SLB sends 1304 the "connect()" to the DSM. The downstream thread validates the request 1320 and issues a "connect()" call to the TCP/IP protocol stack 1322. An upstream thread is created 1324 and a return message generated and sent to the DSL 1326. As with the "bind()" command, return messages are gathered 1330 and returned to the application.

Figure 14:
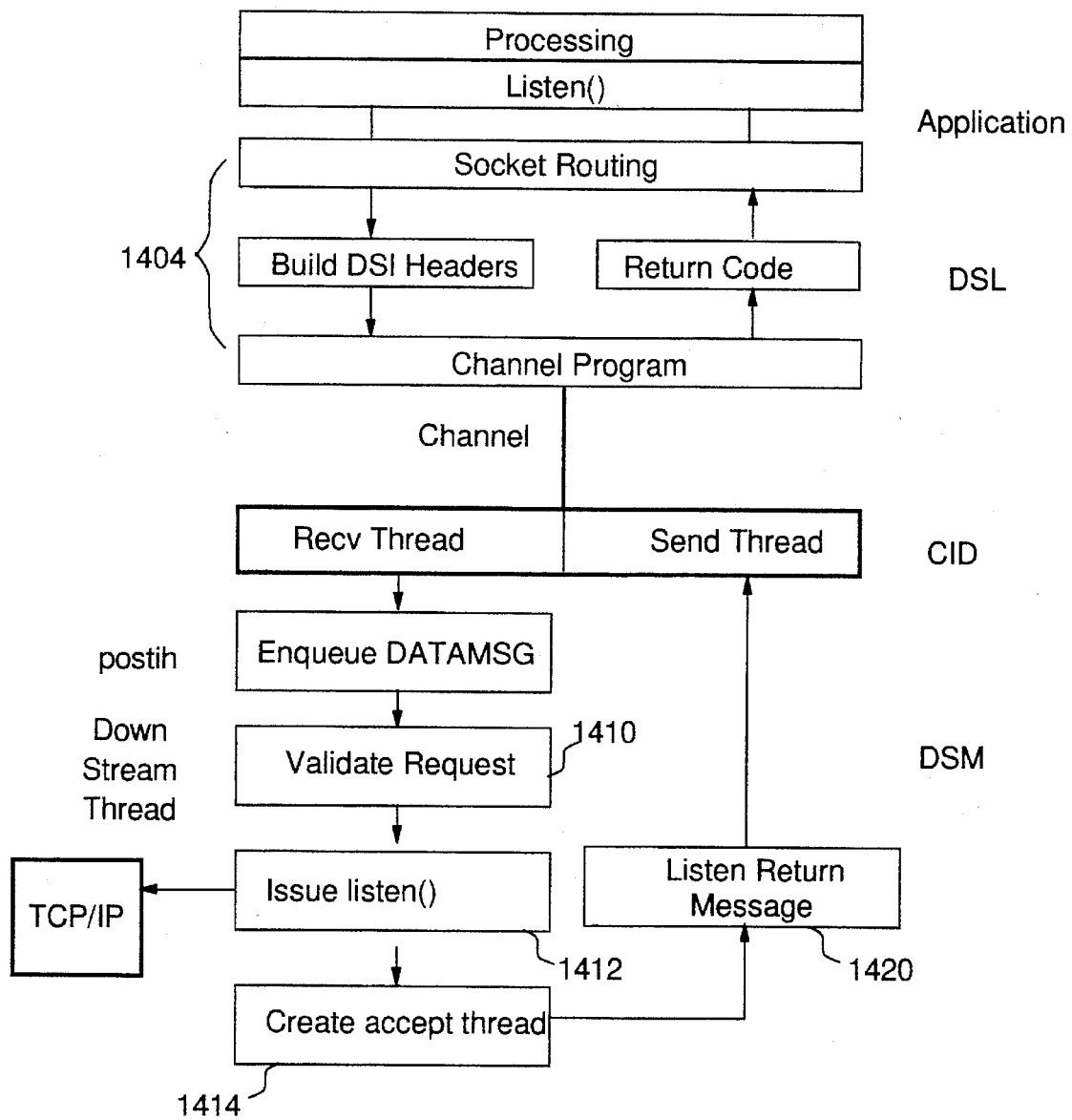

The TCP server "listen()" flow is illustrated in FIG. 14. The "listen()" command is accepted, the DSI and command headers built and is sent to the front end router 1404. The front end router validates the request 1410 and issues a listen() command to the TCP/IP protocol stack 1412. If the listen command to TCP/IP is successful an "accept thread" is started 1414 in the front end router to manage "accepts" and a message returned 1420 to the DSL.

Figure 15:
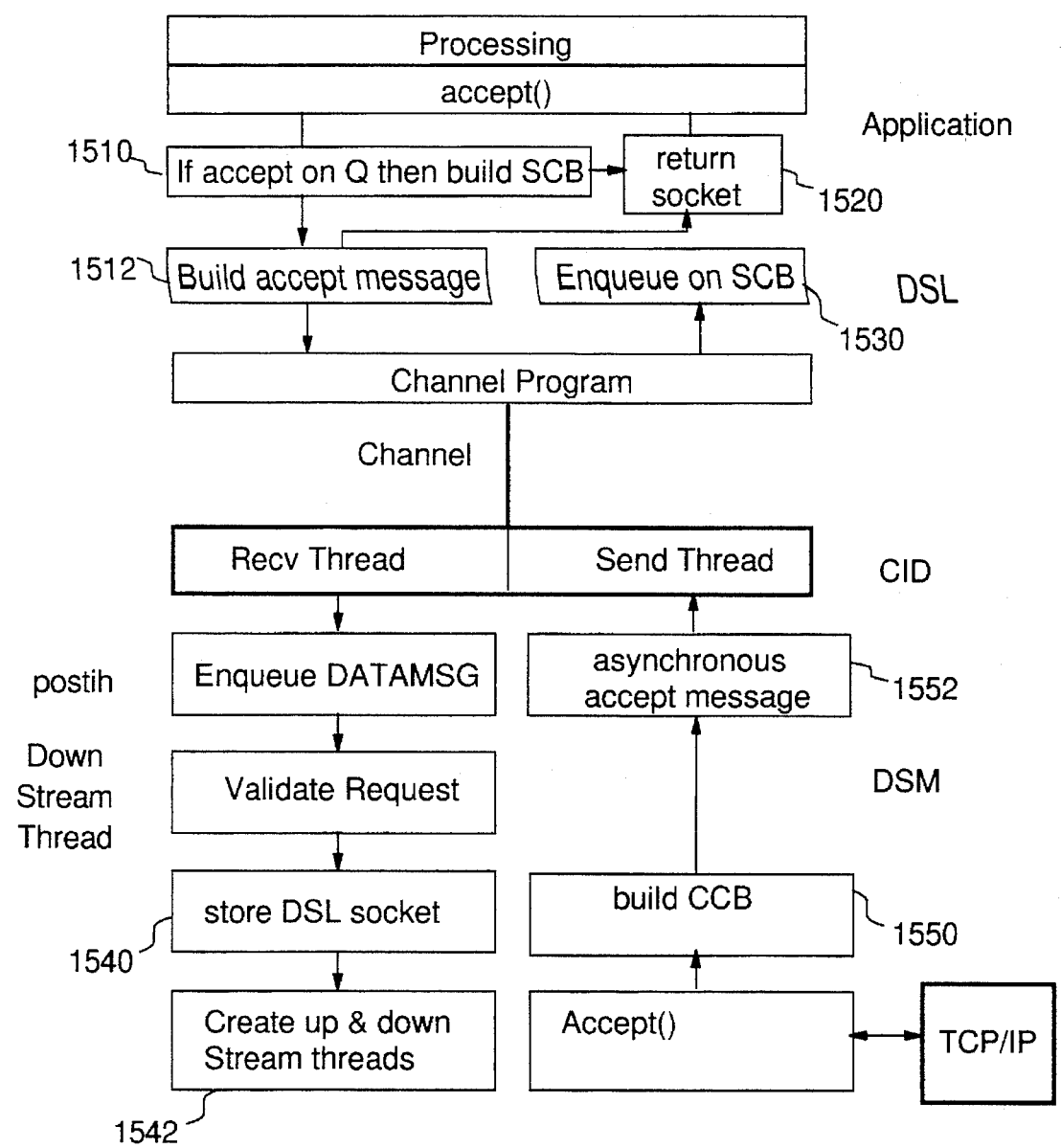

Processing of a TCP server "accept()" API command is illustrated in FIG. 15. When the client application issues a connect() to the socket in the front end router the accept thread wakes up with a connection or an new socket. This thread than builds a Connection Control Block (CCB) for the new socket 1550. This CCB is anchored on the primary CCB which was created by the socket() api call. The DSM then sends an asynchronous accept message 1552 to the DSL. The socket number provided on the return is the address of the CCB. The actual socket number is stored in the CCB for future reference. The DSL will use this CCB address for future write() api calls and the DSM will reference the actual socket using the CCB. The DSL builds an SCB 1510 if the application is waiting (blocked) on an "accept()", returns the socket to the application 1520 and returns an accept confirmation message to the DSM thus creating the virtual socket shown in FIG. 7. Otherwise, the DSL enqueues the accept request 1530 on the accept queue for the appropriate primary SCB. When the application issues an "accept()" the DSL similarly builds an SCB 1510, enqueues it on the TCP SCB chain, sends an accept confirmation message to the DSM 1512 and returns the socket to the application 1520. The DSM accepts and validates the message, stores 1540 the DSLsocket in the CCB, and creates an upstream and downstream thread for the new socket 1542. This illustrates the asynchronous connection method of the preferred embodiment.

Figure 16:
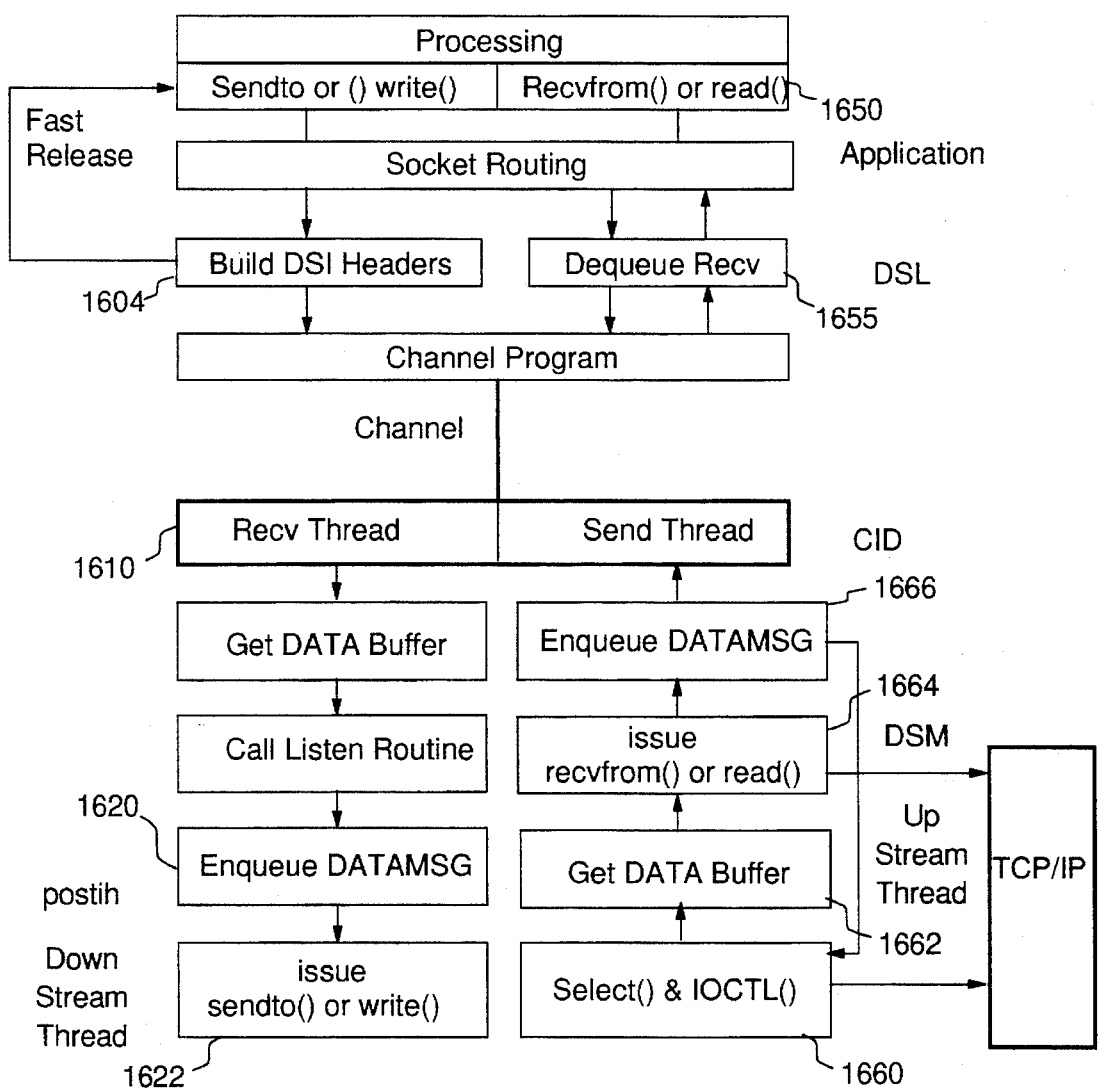

The data flow between applications connected using the above sockets protocol is illustrated in FIG. 16. The data flows are similar for both TCP and UDP. UDP has an upstream and downstream thread for each application socket and TCP has an upstream and downstream thread for each connection. When an application issues a "sendto()" (UDP) or "write()" (TCP) api call, the DSL builds a send request 1604 and sends it to DSM running in the front end router. The postih routine in the DSM enqueues the DATAMSG 1620 on the appropriate downstream thread. The downstream thread is selected based on the socket number in the send request. The postih routine then makes that thread dispatchable. Flow control over the network is handled by this routine. The postih routine then returns control to the recv thread 1610. When all data has been enqueued the recv thread sleeps waiting for an interrupt. The downstream thread next issues the sendto() (UDP) or write() (TCP) API call 1622 to the TCP/IP stack in the front end router.

When an application issues a recvfrom() (UDP) or read() (TCP) api call 1650, the DSL does not build a request for the DSM. Since data is received asynchronously the DSL determines whether data has been previously enqueued. If data is enqueued, the DSL dequeues data 1655 and passes it back to the application.

The upstream thread running in the front end router waits for data using the select() API call 1660. The thread issues an ioctl() call once data is presented to find out the data buffer length and gets a data message and buffer 1662 from the high speed buffer manager. The upstream thread then issues the recvfrom() (UDP) or read() (TCP) for the newly acquired buffer 1664. Finally the upstream thread enqueues the DATAMSG 1666 for transmission on the send thread of the hardware driver, which actually sends the data to the host DSL. The DSL buffers the data waiting for an application to issue a receive, as described above.

The DSL and DSM have a built in flow control mechanism to prevent one connection from using all the memory resources in the host and the front end router. This mechanism is in the form of asynchronous control messages that pass between the DSM and DSL. The postih routine enqueues a DATAMSG on the appropriate thread and checks the enqueue count against a high water indicator. This indicator is selected based on the number of connections and the memory in the front end router. If the enqueue count has reached the high water mark, the postih routine will send a source quench control message to DSL. DSL will stop sending data for that connection until the downstream thread sends a resume data control message. The resume message will be generated when the enqueue count decreases below a low water mark.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer system for exchanging data messages with other computer systems through a point-to point communications network, said point-to-point communications network using a predetermined network transport protocol to transmit and receive data messages, said computer system including:

a). a host system including a host processor for executing application programs and at least one input/output channel, said host system using a host system data transfer protocol for transporting data messages within the host system and over the input output channel that is different from the predetermined network transport protocol, said data messages comprising distributed processing identification information generated by said host processor based on the data message content;

b). a network processor connected to at least one input/output channel of the host system for exchanging data with the host system over the input/output channel using the host system data transfer protocol, said network processor including means for transforming data messages received over the input/output channel to a format in which the transformed data messages are forwarded into the point-to-point communications network for transmission to remote computer systems using the predetermined network transport protocol and for transforming data messages received from the point-to-point communications network to a form which the messages are transmitted into the host system through the input/output channel using the host system data transfer protocol, wherein said message transforming means adds a data message identifier to the received data message and then converts the message in accordance with the distributed processing identification information when a message is transported from the input/output channel to the point-to-point communication network.

2. A system as defined in claim 1 wherein said host system further includes multithreading control blocks for permitting the host system and the network processor system to concurrently process a plurality of data messages.

3. A computer system for exchanging data messages with other computer systems through a point-to point communications network, said point-to-point communications network using a TCP/IP transport protocol to transmit and receive data messages, said computer system including:

a). a host system including a host processor for executing application programs and at least one input/output channel, said host system using a host system data transfer protocol for transporting data messages within the host system and over the input output channel that is different from the TCP/IP transport protocol, said data messages comprising of distributed processing identification information generated by said host processor based on the data message content;

b). a network processor connected to at least one input/output channel of the host system for exchanging data messages with the host system over the input/output channel using the host system data transfer protocol, said network processor including means for transforming data messages received over the input/output channel to a format in which the transformed data messages are forwarded into the point-to-point communications network for transmission to remote computer systems using the TCP/IP transport protocol and for transforming data messages received from the point-to-point communications network to a form which the messages are transmitted into the host system through the input/output channel using the host system data transfer protocol, wherein said message transforming means adds a data message identifier to the received data message and then converts the data message in accordance with the distributed processing identification information when a data message is transported from the input/output channel to the point-to-point communication network.

4. In a computer system including a host system having a processor for executing application programs and for exchanging data messages with said application programs through an application program interface and an input/output channel for carrying data messages in accordance with channel protocols and a network protocol processor connected to the host system through the input/output channel and to one or more remote computer systems through a point-to-point communication network, a method of offloading network protocol processing from the host system to the network protocol processor comprising the steps of:

a). in the host system, augmenting a data message received over the application program interface by adding distributed processing identification information as a function of the data message content and transmitting the augmented data message from the host system to the network protocol processor over the input/output channel;

b). in the network protocol processor, further augmenting the received message by adding a data message identifier and then converting the further augmented message into a format suitable for transport through the point-to-point communications network in accordance with the distributed processing identification information, said communications network carrying data messages in accordance with a predetermined network transport protocol different from said host channel protocol.

5. A computer system for exchanging data message with other computer systems through a point-to-point communications network, said point-to-point communications network using a predetermined network transport protocol to transmit and receive data messages, said computer system including:

a host system having a processor for executing application programs and for exchanging data messages with said application programs through an application program interface and an input/output channel for carrying data messages in accordance with a channel protocol, said host system including means for modifying a data message received at the application interface by adding distributed processing identification information based upon the content of the data message and means for transmitting the modified data message over the input/output channel, wherein said host system uses a host system data transfer protocol different from said predetermined network transport protocol; and a network protocol processor connected to the input/output channel for receiving the modified data message from the host system, said network protocol processor including means for further augmenting the received modified data message by adding a data message identifier and for converting the further augmented message in accordance with the distributed processing identification information into a format suitable for transport through the point-to-point communications network.

6. For use in a system having a host processor, at least one high speed input/output channel and storage means for storing data, said host processor including means for accepting data message in a first format, means for transforming the data message in an augmented data message by adding distributed processing identification information based upon the content of the data message and means for transmitting said augmented data message through the high speed input/output channels in accordance with a host system data transfer protocol, a protocol processor including:

means for connecting the protocol processor to said high speed input/output channel;

means for receiving augmented data messages from the host processor through the high speed input/output channel;

means for further augmenting received augmented data messages by adding a data message identifier;

means for transforming the further augmented data messages into network recognizable units based upon distributed processing identification information contained within the data messages;

means for connecting said protocol processor to a network, said network using a predetermined network transport protocol different from the host system data transfer protocol; and means for transmitting the transformed further augmented data messages into the network through said connecting means.

7. For use in a system having a host processor, at least one high speed input/output channel and storage means for storing data, said host processor including means for accepting a data message in a first format, means for transforming the data message to an augmented data message by adding distributed processing identification information based upon the content of the data message and means for transmitting said augmented data message through the high speed input/output channel in accordance with a host system data transfer protocol, a method to be performed at a protocol processor connected to the host processor through the high speed input/output channels and to a point-to-point network through at least one network adapter, said method comprising the steps of:

receiving augmented data messages provided by the host processor through the high speed input/output channel;

further augmenting the received augmented data messages by adding a data message identifier to each of said message;

transforming said further augmented data messages into network recognizable units based upon the distributed processing identification information contained within the data messages; and transferring the transformed further augmented data message into the point-to-point network, said point-to-point network using a predetermined network transport protocol different from said host system data transfer protocol.

* * * * *